(12) United States Patent
Butler et al.

(10) Patent No.: US 7,384,468 B2
(45) Date of Patent: Jun. 10, 2008

(54) ASPHALT/AGGREGATE COMPOSITION OF ENHANCED ADHESION

(75) Inventors: James R. Butler, Pasadena, TX (US); William Lee, Humble, TX (US); Paul Buras, West University Place, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/010,612

(22) Filed: Dec. 13, 2004

(65) Prior Publication Data

US 2006/0124031 A1    Jun. 15, 2006

(51) Int. Cl.
*C08L 95/00*    (2006.01)
*C09D 195/00*    (2006.01)

(52) U.S. Cl. .................. 106/269; 106/284.02
(58) Field of Classification Search ............... 106/269, 106/284.02
See application file for complete search history.

(56) References Cited

U.S. PATENT DOCUMENTS

| | | | |
|---|---|---|---|
| 3,868,263 A | | 2/1975 | McConnaughay |
| 4,617,227 A | * | 10/1986 | Weaver ................. 428/220 |
| 5,501,730 A | * | 3/1996 | Duong et al. ........... 106/281.1 |
| 5,670,562 A | | 9/1997 | Schilling |
| 5,735,948 A | * | 4/1998 | Cha et al. ................ 106/724 |
| 6,407,152 B1 | | 6/2002 | Butler et al. |
| 6,546,688 B1 | | 4/2003 | Parsons |
| 6,569,351 B1 | * | 5/2003 | Baumgardner et al. 252/182.17 |

OTHER PUBLICATIONS

CAPLUS AN 1976:94684, Koyama et al, Japanese Patent 50110419, Aug. 30, 1975, CAS abstract published May 12, 1984.*

* cited by examiner

*Primary Examiner*—David M Brunsman
(74) *Attorney, Agent, or Firm*—William D. Jackson; Tenley Kruger

(57) ABSTRACT

An asphalt/aggregate composition having enhanced adhesion characteristics and its preparation. An asphalt base material is heated to a molten state in order to permit mixing of the asphalt with added components. A heavy metal soap is incorporated into the asphalt base material to enhance the adhesion of the asphalt base material with an aggregate component which is mixed with the asphalt base material to provide an asphalt/aggregate blend. The asphalt and aggregate can be blended together in a mixing chamber to provide a fluid asphalt/aggregate concrete which is then dispensed on a substrate surface or the asphalt base material and aggregate components can be separately applied to the substrate surface to provide the ultimate asphalt/aggregate concrete. The heavy metal soap is a $C_{14}$-$C_{18}$ heavy metal soap such as zinc stearate. Zinc oxide may also be added to the asphalt base material in an amount which is less than the amount of zinc stearate. The asphalt base material may be polymer-modified asphalt and may incorporate a crumb rubber component to provide a rubber-modified asphalt.

24 Claims, 1 Drawing Sheet

ASPHALT/AGGREGATE COMPOSITION OF ENHANCED ADHESION

FIELD OF THE INVENTION

This invention relates to asphalt/aggregate compositions and their preparation and more particularly, to asphalt/aggregate compositions incorporating heavy metal soaps which enhance the adhesion between the asphalt and aggregate particles.

BACKGROUND OF THE INVENTION

Asphalt may be characterized as an organic cementitious material in which the predominant constituents are bitumens as they may occur in nature or as they may be produced as byproducts in petroleum refining operations. Asphalt can generally be characterized as a dark brown or black solid or highly viscous liquid, which incorporates a mixture of paraffinic and aromatic hydrocarbons as well as heterocyclic compounds containing Group 15 or 16 elements, such as nitrogen, oxygen or sulfur.

Asphalts have many industrial applications involving use as paving or road surfacing materials. Perhaps the most widespread use of asphalt compositions is in road surfacing and paving applications. The asphalt may be used alone, such as where it is applied to the surface of an existing paving structure, or it may be used as an aggregate composition in which the asphaltic base material is mixed with an aggregate, typically in an amount of 4-10 wt. %. The asphalt material can be modified through the use of polymers to produce so-called polymer-modified asphalts. Polymer-modified asphalts or "PMA" function to provide improved characteristics as a paving material.

In addition to polymers, it is a conventional practice to incorporate scrap rubber particles into an asphalt matrix material to form asphalt paving or sealing materials. Such scrap rubber particles are referred variously as ground tire rubber (GTR) or crumb rubber and can include materials recovered from tire carcasses, reclaimed tire treads and the like. The asphalt base material incorporating such crumb rubber particles can be of any suitable type such as derived from petroleum refining operations and include aliphatic and aromatic hydrocarbons and heterocyclic compounds, including asphaltenes and malthenes of fairly high molecular weight. Aggregate particles as described above, ranging from sand to crushed rock the size of perhaps ¼-½ inch can be incorporated into the asphalt base material. The asphalt binder aggregate concrete formulation can be used as a concrete base for roads. Alternatively, a blend of asphalt can be applied as a sealer coat on top of existing road paving. Such sealing coats typically may be a thickness of ⅛-¼ inch and may incorporate aggregate materials, or relatively finely ground aggregate materials can be dispensed on the sealer coat while it is hot, immediately after its application or after allowing the sealer to set for a period of a few hours or days. Yet another procedure for providing an asphalt/aggregate road composition involves depositing a layer of the aggregate material on a substrate surface such as a road bed or the like and thereafter depositing the asphalt binder material on the layer of aggregate to provide an asphalt/aggregate road surfacing composition.

As noted previously, polymers can be added to asphalts to improve physical and mechanical performance properties. Such polymers include elastomeric-type polymers such as butyl, polybutadiene, polyisoprene or polyisobutene rubber, ethylene/vinyl acetate copolymer, polyacrylate, poly-methacrylate, polychloroprene, polynorbornene, ethylene/propylene/diene (EPDM) terpolymer and advantageously a random or block copolymer of styrene and a conjugated diene, such as butadiene or isoprene. The modified asphalts thus obtained are referred to variously as bitumen/polymer binders or asphalt/polymer mixes. Modified asphalts and asphalt emulsions can be produced utilizing styrene/butadiene-based polymers to provide raised softening points, increased viscoelasticity, enhanced force under strain, enhanced strain recovery and improved low temperature strain characteristics.

An important factor in asphalt/aggregate paving materials is the degree of adhesion between the asphalt and the aggregate in the paving material. If good adhesive characteristics are not present, exposure of the asphalt/aggregate paving formulation to traffic and weather conditions ultimately results in stripping of the asphalt and an undesirable separation of the asphalt and aggregate material with crumbling and disruption of the paving surface. Another important consideration is the degree of contact or coverage of the asphalt binder material over the aggregate particles. If there is good contact of the asphalt over the surfaces of the aggregate particles, the resulting composition can be expected to have a high degree of integrity. However, if coverage is spotty and incomplete, the asphalt/aggregate composition will show poor integrity under heavy vehicular traffic, resulting in crumbling of the asphalt/aggregate concrete with formation of potholes and the like.

SUMMARY OF THE INVENTION

In accordance with the present invention, there is provided a method for preparing an asphalt/aggregate composition having enhanced adhesion characteristics. In carrying out the invention, an asphalt base material is heated to a molten state in order to permit mixing of the asphalt with added components. A heavy metal soap is incorporated into the asphalt base material in an amount sufficient to enhance the adhesion of the asphalt base material with an aggregate component. The aggregate component and the asphalt base material are mixed together to provide a blend of the asphalt base material and aggregate. The asphalt and aggregate can be blended together in a mixing chamber to provide a fluid asphalt/aggregate concrete which is then dispensed on a substrate surface. Alternatively, the asphalt base material and aggregate components can be separately applied to the substrate surface to provide the ultimate asphalt/aggregate concrete. Separate application can be accomplished by depositing a layer of the aggregate material on the substrate surface and thereafter depositing the asphalt on the layer of aggregate or the reverse order of application of the asphalt and aggregate materials can be followed.

In a preferred application of the present invention, the heavy metal soap is a $C_{14}$-$C_{18}$ heavy metal soap and more particularly, a heavy metal soap selected from the group consisting of zinc stearate, zinc oleate and zinc palmitate. Preferably, the soap is zinc stearate. The zinc stearate preferably is added in a relatively limited amount within the range of 0.1-1 wt. % and more specifically, within the range of 0.2-0.6 wt. %. In addition to the addition of zinc stearate, zinc oxide is also added to the asphalt base material. The zinc oxide is employed in an amount which is less than the amount of zinc stearate.

In a further embodiment of the invention, the asphalt base material may be polymer-modified asphalt and may incorporate a crumb rubber component to provide a rubber-modified asphalt. In formulating a polymer-modified asphalt, a thermoplastic polymer can be incorporated into the asphalt material prior to the addition of the heavy metal soap. A cross-linking agent incorporating zinc oxide may be added to the polymer-modified asphalt to cross-link the thermoplastic polymer.

In a further aspect of the invention, there is provided an asphalt paving composition comprising an asphalt base material in admixture with a particulate aggregate material. The asphalt base material contains a heavy metal soap in an amount sufficient to enhance the adhesion of the asphalt with the aggregate material and to reduce the coefficient of stripping of the asphalt material from the aggregate to a value which is no more than one-half the coefficient of stripping of the asphalt and aggregate materials without the incorporation of a heavy metal soap. Preferably, the coefficient of stripping is reduced to a value of no more than one-fourth the coefficient of stripping of the asphalt material from the aggregate without the incorporation of the heavy metal soap. Preferably, the heavy metal soap is zinc stearate which is present in the asphalt in a concentration providing for an RTFO DSR temperature which is at least 90% of the RTFO DSR temperature of the asphalt without the presence of zinc stearate.

DESCRIPTION OF THE DRAWINGS

The drawing is a graph illustrating the relationship between zinc stearate concentration and the RTFO DSR temperature of a zinc stearate polymer-modified asphalt blend.

DETAILED DESCRIPTION OF THE INVENTION

Figure 1:
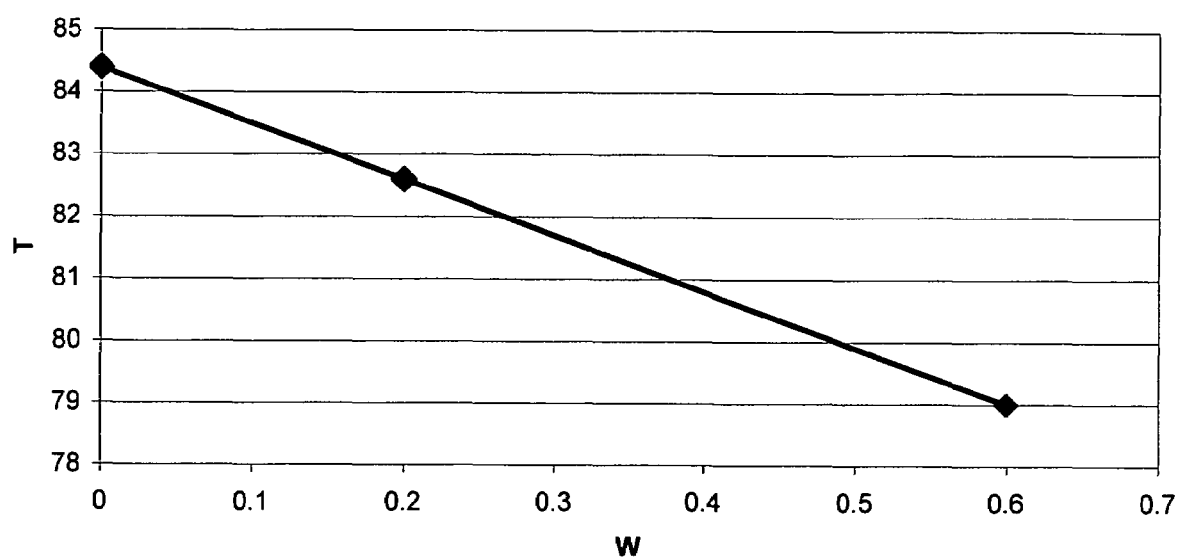

The present invention provides for the preparation of aggregate/asphalt formulations which are highly resistant to stripping of the asphalt binder material from the aggregate and produce good coating of the asphalt over the aggregate surfaces. The formulations of the present invention can be employed to provide vehicle-bearing surfaces such as roads, parking lots and the like. Such surfaces are subject to deterioration under the stresses imposed by vehicular surfaces and in conjunction with ambient weather conditions, which result in repeated hydration of the surface of the asphalt/aggregate concrete. The quality of such surfaces is dependent, in part, upon the strength of the bonding between the aggregate particles and the asphalt binder after the curing of the asphalt composition. Where poor adhesion between the binder and aggregate is present, the asphalt tends to strip off the surfaces of the aggregate materials. This stripping action is particularly pronounced in the presence of water. Since the aggregate materials tend to be preferentially wetted by water, disruption of the asphalt concrete surface results in increased penetration of water into the interior matrix of the asphalt concrete formulation. As the asphalt binder material tends to become "stripped" from the surfaces of the particulate aggregate, stripping and a separation of the asphalt from the rock materials occurs, resulting in surface disruption, potholes in the asphalt/aggregate material and the like.

From the foregoing, it will be recognized that one approach to providing for good adhesion between an aggregate and the asphalt binder would be to attempt to treat the aggregate material with surface active material in order to change the surface chemistry characteristics of the rock surfaces. For example, the rock surfaces can be treated in an attempt to make the surfaces preferentially oil wettable in order to decrease the water wetting of the surfaces and render them preferentially wettable by the asphalt material. The present invention proceeds in a contrary fashion to enhance the coverage of the aggregate by the asphalt and/or reduce the stripping coefficient of the asphalt material relative to the aggregate material by incorporating a small amount of a heavy metal soap, preferably zinc stearate, into the asphalt binder material. The heavy metal soap is employed in an amount which is sufficient to materially decrease the stripping coefficient between the asphalt material and the aggregate surfaces, while at the same time only minimally affecting the rheological properties of the asphalt base material.

The zinc stearate or other heavy metal salt may be incorporated into the asphalt/aggregate composition by any suitable procedure and at any suitable time during its formulation. Normally, the heavy metal soap will be incorporated after heating of the asphalt material and prior to mixing of the aggregate component with the asphalt base material. Where a polymer-modified asphalt is involved, the heavy metal soap normally will be incorporated after addition of the thermoplastic polymer used to constitute the polymer-modified asphalt, although the heavy metal soap can be added first, followed by addition of the polymer modifier. Further, the heavy metal soap may be added during or after mixing of the aggregate component and the asphalt component. For example, the heavy metal soap in powder form may be mixed with the aggregate material and this mixture then blended with the asphalt base material. Further, a particulate suspension of the heavy metal soap in a carrier fluid, such as an alcohol or ether, may be added to the asphalt base material.

The heavy metal soap will normally be in a powder form at ambient temperature conditions and if desirable, the heavy metal soap in the powdered form may be blended with the asphalt base material, and the asphalt base material then heated to the molten state. Normally, in order to provide a relatively homogeneous blend of the heavy metal soap and the asphalt aggregate composition, the heavy metal soap will be added to the asphalt base material after it is heated to a molten state and prior to mixing of the molten asphalt base material with the aggregate component. The heavy metal soap may be added as a particulate (powder) or it may be melted and added as a liquid.

Various studies and test procedures have been developed in order to characterize the performance grades of asphalt binders and asphalt aggregate concrete materials. Once source of standards for asphalt materials is found in a publication by the Asphalt Institute, entitled "SUPERPAVE Series No. 1 (SP-1) Performance Graded Asphalt Binder Specification and Testing, $3^{rd}$ Ed., 2003 by the Asphalt Institute, Research Park Drive, P.O. Box 14052, Lexington, Ky. 40512-4052. As addressed in the SUPERPAVE booklet, asphalt characteristics are developed by rolling thin film oven (RTFO), pressure aging vessels (PAV), dynamic shear rheometers (DSR) and bending beam rheometers (BBR) studies. Important characteristics of asphalts are presented in terms of RTFO DSR temperatures, PAV DSR temperatures, BBR/m-Value temperatures and BBR/S-Value temperatures. For a description of these asphalt characteristics and the manner in which they are measured, reference is made to the aforementioned SUPERPAVE Series No. 1 booklet, the entire disclosure of which is incorporated herein by reference. Perhaps simplistically, for a given asphalt formulation, the effect of these parameters on the formulation can be characterized as follows, all other things being equal. A lowering of the PAV DSR temperature can be considered to be an improvement. Similarly, an improvement can be characterized by an increase in the RTFO DSR temperature. The BBR/S-Value is the temperature in ° C. corresponding to an allowable deflection of the asphalt beam after 60 seconds loading on the Bending Beam Rheometer and the m-Value indicates the minimum temperature in which the slope of the log of creep stiffness vs. the log of loading time reaches 0.3 after 60 seconds of loading on the Bending Beam Rheometer. Thus, all other things being equal, an improvement in the asphalt characteristics responds to a decrease in the m-Value temperature or a decrease in the S-Value temperature.

While the foregoing parameters are important in characterizing the asphalt binding material in terms of its rheological properties, the aggregate adhesion characteristics of the asphalt/aggregate mixture composition can be quantitatively stated and adhesion coefficient measured in terms of test method Tex-530-C, "Effect of Water on Bituminous Paving Mixtures," 500-C, Asphalt Test Procedures Manual. As described below, the amount of asphalt in terms of percent asphalt stripped from an asphalt/aggregate mixture after heating and mixing with boiling water can be evaluated to provide a "coefficient of stripping" in terms of the percent of original asphalt removed from the asphalt/aggregate mixture.

In experimental work respecting the invention, SHRP and asphalt adhesion and stripping parameters were determined for asphalt and polymer-modified asphalts for asphalt formulations containing 0.2 and 0.6 zinc stearate concentrations. The asphalt material used in the blends was a paving-grade asphalt without modification and with modification by the incorporation of an aromatic hydrocarbon oil available from Sunoco, Inc. under the designation Hydrolene 600T. Three asphalt binders containing Hydrolene 600T oil and three polymer-modified asphalts containing the Hydrolene oil were employed in the experimental work. The polymer-modified asphalt incorporated a styrene butadiene styrene polymer in an amount of 4 wt. % and a cross-linking formulation comprising two parts sulfur and one part each zinc oxide and mercaptobenzothiazole. The pure asphalt binder material (without the addition of the Hydrolene 600T) exhibited a binder DSR temperature of 74.2° C., an RTFO DSR temperature of 76.7° C., a PAV DSR temperature of 31.9° C. and BMR/m and S-Values of −6.0 and −9.3° C. Various unmodified asphalt and polymer-modified asphalt binders had corresponding rheological parameters and composite formulations as set forth below in Tables I and II.

TABLE I

| | | Blend | | |
|---|---|---|---|---|
| | Neat | 1 | 2 | 3 |
| PAR 522tk (01-156) | 100 | 91.0 | 90.8 | 90.4 |
| Hydrolene 600T | | 9.0 | 9.0 | 9.0 |
| Zinc Stearate | | | 0.2 | 0.6 |
| Binder DSR (° C.) | 74.2 | 66.9 | 67.2 | 66.7 |
| RTFO DSR (° C.) | 76.7 | 67.9 | 67.3 | 67.2 |
| PAV DSR (° C.) | 31.9 | 22.9 | 23.3 | 23.2 |
| m-Value (° C.) | −6.0 | −13.6 | −13.9 | −14.6 |
| S-Value (° C.) | −9.3 | −14.8 | −14.6 | −14.9 |

TABLE II

| | Blend | | |
|---|---|---|---|
| | 4 | 5 | 6 |
| PAR 522tk (01-156) | 87.0 | 86.8 | 86.4 |
| Hydrolene 600T | 9.0 | 9.0 | 9.0 |
| LG502 | 4.0 | 4.0 | 4.0 |
| Zinc Stearate | | 0.2 | 0.6 |
| ZnO | 0.06 | 0.06 | 0.06 |
| MBT | 0.06 | 0.06 | 0.06 |
| Sulfur | 0.12 | 0.12 | 0.12 |
| Binder DSR (° C.) | 85.5 | 85.8 | 83.2 |
| RTFO DSR (° C.) | 84.4 | 82.6 | 79.0 |
| PAV DSR (° C.) | 20.4 | 19.4 | 21.5 |
| m-Value (° C.) | −16.1 | −16.2 | −16.1 |
| S-Value (° C.) | −17.7 | −17.3 | −17.4 |
| Compatibility (° F.) | 1.5 | 0.2 | 1.4 |
| Rubber Response | 4.38 | 3.93 | 3.03 |

As indicated in the above tables, formulations 2 and 5 each contained 0.2 wt. % zinc stearate and formulations 3 and 6 each contained 0.6 wt. % zinc stearate.

The neat asphalt blends containing zinc stearate were prepared by heating the asphalt to a temperature of 350° F. in a mixing vessel with stirring at a low shear rate. After the asphalt reached the 350° F. level, the zinc stearate and Hydrolene 600T were added with continued stirring at the same low shear rate for 45 minutes. The polymer blends were prepared by adding the polymer to each blend at the conclusion of the 45 minute stirring period. Mixing was then continued at a high shear rate for one hour at 350° F. The mixing rate was then reduced to the low shear rate and the cross-linking formulation of zinc oxide, mercaptobenzothiazole and sulfur was added, followed by mixing at a low shear rate at a temperature of 350° F. for a period of one hour. This mixture was then heated in an oven at 325° F. for a period of 24 hours.

The adhesion characteristics and the stripping coefficient of the neat asphalt and the polymer-modified asphalt blends was evaluated in accordance with test method Tex-530-C, "Effect of Water on Bituminous Paving Mixtures," as cited previously, employing the following test procedure. Approximately 1,000 grams of asphalt/aggregate mixture was prepared following the procedure of Tex-530-C as follows. The preheated asphalt mixture was added to the aggregate in the mixture and the asphalt/aggregate then mixed for two minutes with a small masonry pointed trowel. The pan containing the mix was then placed in an oven sufficiently long to bring the temperature to 275±5° F. The cycle of mixing for two minutes followed by heating in an oven to 275±5° F. was repeated two more times for a total mixing time of six minutes. The mixture was then allowed to cool to room temperature and allowed to set for 24±2 hours prior to the stripping test.

The stripping test was conducted by bringing an oil bath to a temperature of 325° F. A 2000 ml stainless steel beaker was filled about half full of deionized water and heated to boiling in the oil bath. Approximately 200 g of the coated mixture was placed in the beaker of boiling water and the beaker was swirled to distribute the mix evenly over the bottom of the container. The water and asphalt/aggregate mixture was then heated to boiling and allowed to boil for ten minutes before being removed from the heat. A white paper towel was dipped into the beaker to skim the stripped asphalt from the water surface. The water was decanted from the beaker and the asphalt/aggregate mixture was placed on a white paper towel. The mixture was then visually inspected to determine the degree of coating of the aggregate and the degree of stripping. The amount of asphalt on both the paper towel and remaining in the beaker were estimated to determine the degree of stripping. The asphalt/aggregate mixture was allowed to dry and then visually inspected again the next day.

The estimated percent stripping for each of Blends 1-6 from the asphalt/aggregate mixture are set forth in the following Table III.

TABLE III

| Blend | % Stripping |
|---|---|
| Blend #1: 522/9% Hydrolene 600T | >30 |
| Blend #2: 522/9% Hydrolene/0.2 wt. % ZnSt | ≈5 |
| Blend #3: 522/9% Hydrolene/0.6 wt. % ZnSt | ≈5 |
| Blend #4: 522/9% Hydrolene/4% PMA | <2 |
| Blend #5: 522/9% Hydrolene/0.2 wt. % ZnSt/4% PMA | ≈3 |
| Blend #6: 522/9% Hydrolene/0.6 wt. % ZnSt/4% PMA | <2 |

As indicated by the results for Blends 2 and 3, stripping with the 0.2 and 0.6 wt. % zinc stearate formulations was reduced substantially from the Blend 1 in which zinc stearate was not present. For the polymer-modified asphalts, stripping remained low as would be expected because of the polymer present in the asphalt. For the polymer-modified blends, although there was little stripping indicated by the test procedure, a visual observation of the rock surfaces indicated that there was a large percentage that was not coated with the asphalt/polymer blend. For Blends 5 and 6 which contained zinc stearate, the rock surfaces exhibited a generally uniform coating over most of the surfaces. Thus, although the zinc stearate appeared to have little effect on the stripping of the polymer-modified asphalt which already exhibited a very low stripping rate, the zinc stearate did exhibit an improvement facilitating the even distribution of asphalt on the aggregate surfaces. The best coating was shown by Blend 6. Visual inspection here indicated that the aggregate surfaces were well coated with the asphalt and this blend was considered to be the overall best performer. For Blend 5, the coating on the rock surfaces was relatively uniform and the asphalt covered most of the surfaces. For Blend 4, which did not contain zinc stearate, visual inspection indicated a large percentage of the rock surfaces that were uncoated.

Similar results were shown for the Blends 1, 2 and 3 which did not involve a polymer-modified asphalt. Blend 1, which showed a high degree of stripping, also showed a poor coverage of the rock surfaces by the asphalt. The coating on the aggregate was thin and "blotchy" providing many uncoated areas on the aggregate. For Blend 2, the asphalt coating was relatively good and for Blend 3, the asphalt coating was substantially better. The coating on the rock surfaces was evenly distributed and although thin in some places, substantially all of the rock surfaces were coated.

While the unmodified asphalt/aggregate blends with 0.2 and 0.6 wt. % zinc stearate showed approximately the same RTFO DSR temperature as the asphalt/Hydrolene blend without zinc stearate, the RTFO DSR temperature for the polymer-modified asphalt showed a steady decrease with increase in zinc stearate concentration. The relationship between zinc stearate concentration and the RTFO DSR temperature is shown as well in FIG. 1. In FIG. 1, the RTFO DSR temperature T, in ° C., is plotted on the ordinate vs. the weight percent of zinc stearate, W, plotted on the abscissa. It will be noted that although some undesirable decrease in the RTFO DSR temperature was observed, this was maintained within manageable limits to provide an RTFO DSR temperature of at least 90% of the RTFO DSR temperature without zinc stearate, by maintaining the zinc stearate at the relatively low level of 0.6 wt. %. Thus, this would be desirable where the asphalt is not polymer-modified. For the unmodified asphalt, the RTFO DSR temperature appeared about the same and by extrapolation of the data shown in Table I, zinc stearate up to an amount of about 1 wt. % can be used without a substantial decrease in the RTFO DSR temperature.

From the foregoing experimental work, it can be seen that the use of zinc stearate functions to enhance the original coating of the asphalt binder on the aggregate surfaces. In addition, where the asphalt does not incorporate a substantial amount of polymer as in Blends 1-3, the presence of the zinc stearate substantially reduces the stripping coefficient of the asphalt/aggregate blend.

Having described specific embodiments of the present invention, it will be understood that modifications thereof may be suggested to those skilled in the art, and it is intended to cover all such modifications as fall within the scope of the appended claims.

The invention claimed is:

1. An asphalt paving composition comprising an asphalt base material in admixture with a particulate aggregate material wherein said asphalt base material contains a single adhesion enhancing additive consisting essentially of a heavy metal soap in an amount sufficient to enhance the adhesion of said asphalt base material with said aggregate material to reduce the coefficient of stripping of said asphalt material from said aggregate material to a value which is no more than one-half the coefficient of stripping of said asphalt base material and aggregate material without the incorporation of said heavy metal soap.

2. The composition of claim 1 wherein the coefficient of stripping of said asphalt material from said aggregate material is no more than one-fourth the coefficient of stripping of said asphalt base material from said aggregate material without the incorporation of said heavy metal soap.

3. The composition of claim 1 wherein said heavy metal soap is a $C_{14}$-$C_{18}$ heavy metal soap.

4. The composition of claim 3 wherein said heavy metal soap is selected from the group consisting of zinc stearate, zinc oleate and zinc palmitate.

5. The composition of claim 3 wherein said heavy metal soap is zinc stearate.

6. The composition of claim 5 wherein said asphalt base material contains zinc oxide in a concentration which is less than the concentration of said zinc stearate.

7. The composition of claim 5 wherein the concentration of zinc stearate in said asphalt base material is within the range of 0.2-0.14 wt. %.

8. The composition of claim 5 wherein said zinc stearate is present in said asphalt base material in a concentration providing for an RTFO DSR temperature which is at least 90% of the rolling thin film oven dynamic shear rheometers temperature of said asphalt base material without the presence of zinc stearate.

9. A method for preparing an asphalt/aggregate composition having an enhanced aggregate adhesion comprising:
   providing an asphalt base material;
   heating said asphalt base material to a molten state permitting mixing thereof;
   incorporating a single adhesion enhancing additive consisting essentially of a heavy metal soap into said asphalt base material in an amount sufficient to enhance the adhesion of said asphalt base material with an aggregate material as hereinafter recited;

providing an aggregate component; and mixing said aggregate component and said asphalt base material together to provide a blend of said asphalt base material and said aggregate.

10. The method of claim 9, wherein said heavy metal soap is incorporated into said asphalt base material after the heating of said asphalt base material to a molten state and prior to mixing of said asphalt base material and said aggregate component.

11. The method of claim 9, wherein said heavy metal soap is incorporated into said asphalt base material during or after mixing of said asphalt base material with said aggregate component.

12. The method of claim 9, wherein said heavy metal soap is a $C_{14}$-$C_{18}$ heavy metal soap.

13. The method of claim 12 wherein said heavy metal soap is selected from the group consisting of zinc stearate, zinc oleate and zinc palmitate.

14. The method of claim 13 wherein said heavy metal soap is zinc stearate.

15. The method of claim 14 wherein said zinc stearate is added to said asphalt base material in an amount within the range of 0.1-1 wt. %.

16. The method of claim 14 wherein said zinc stearate is added to said asphalt base material in an amount within the range of 0.2-0.14 wt. %.

17. The method of claim 16 wherein zinc oxide is added to said asphalt base material in an amount which is less than the amount of zinc stearate added to said asphalt base material.

18. The method of claim 9, wherein said asphalt base material is a polymer-modified asphalt.

19. The method of claim 18 wherein said asphalt base material has a crumb rubber component incorporated therein.

20. The method of claim 9, further comprising adding a thermoplastic polymer to said asphalt base material to provide a polymer-modified asphalt blend.

21. The method of claim 20 wherein said heavy metal soap is incorporated into said asphalt base material after the addition of said thermoplastic polymer to said asphalt base material.

22. The method of claim 20 further comprising adding a cross-linking agent comprising zinc oxide to said polymer-modified asphalt material to cross-link said thermoplastic polymer.

23. The method of claim 22 wherein said heavy metal soap is zinc stearate and said zinc oxide is present in a concentration less than the concentration of said zinc stearate.

24. The method of claim 9, wherein said asphalt base material and said aggregate are mixed together by depositing a layer of said aggregate material on a solid substrate surface and separately depositing said asphalt base material on said layer of aggregate material.

* * * * *